May 26, 1964

E. D. ORENSTEIN

3,134,974

RADAR DATA PRESENTATION

Filed June 29, 1959

INVENTOR.
EDWARD D. ORENSTEIN
BY Carlsen & Hayle

ATTORNEYS

May 26, 1964 E. D. ORENSTEIN 3,134,974
RADAR DATA PRESENTATION
Filed June 29, 1959 3 Sheets-Sheet 3

INVENTOR.
EDWARD D. ORENSTEIN
BY Carlsen & Hazle
ATTORNEYS

United States Patent Office 3,134,974
Patented May 26, 1964

3,134,974
RADAR DATA PRESENTATION
Edward D. Orenstein, Minneapolis, Minn., assignor to Data Display Incorporated, St. Paul, Minn., a corporation of Minnesota
Filed June 29, 1959, Ser. No. 823,651
22 Claims. (Cl. 343—11)

This invention relates to methods and apparatus for displaying on a cathode ray tube intermixed radar and non-radar data and more specifically to methods and apparatus for employing digital techniques in a combined radar and non-radar data display system.

The use of Plan Position Indicators (PPI) for presenting radar received data is well known. The purpose of a PPI is to accurately and almost instanteously present the direction in which the radar antenna emitted interrogating pulses or "main bangs" are directed as well as the range and azimuth location of radar type signals received by the antenna. A typical prior system for providing a PPI tube deflection system which operates synchronously with the radar is described by Pollard and Sturtevant, "Microwaves and Radar Electronics," John Wiley and Sons, New York, 1948, beginning on page 215. This system essentially provides a voltage analogue of the antenna position and range of the radar target. When such a system is used alone with a radar the operation can be very satisfactory.

With the rapid advance of transportation and military air systems a PPI type display showing only radar data has become inadequate to provide enough information for an operator viewing it to make appropriate decisions necessary for maximum utilization of the air systems. The insertion of non-radar data alongside the radar data is one means of greatly improving the effectiveness of the air systems. Several systems for providing such features have been tried including having parallel analogue voltage inputs to the deflection system for the radar and non-radar data. Such systems are subject to drift, i.e., the non-radar data moves randomly with respect to the radar data on the PPI and continuous corrections may have to be made to keep the non-radar accurately associated with the radar data. Other systems provide for a matrix constructed inside the PPI tube to provide symbols indicative of non-radar data providing a limited number of symbols which are still subject to drift due to the separate deflection voltage sources.

Accordingly it is an object of this invention to provide radar data and non-radar data presentation on a common display with no drift of the non-radar data presentation with respect to the radar data presentation caused by variations in deflection voltages.

It is another object of this invention to provide a completely digital method of and apparatus for providing a PPI radar display.

It is a further object of this invention to provide a method and apparatus for digitally selecting a range presentation which automatically shifts the radar and non-radar digital data deflection signals to the selected range.

It is another object of this invention to provide apparatus in a digital deflection system to provide both polar and rectangular range marking signals for use with a PPI display.

It is still another object of this invention to provide a digital method and apparatus for maintaining digitally constructed rotating PPI beam centrally located on the PPI tube in various range presentation selections.

These and other more detailed and specific objects will be disclosed in the course of the following specification, reference being had to the accompanying drawings, in which—

With more particular reference now to the drawing like numbers denote like parts in the various views and diagrams. In FIG. 1 there is shown a radar unit 10 having either an electronic or a physically rotating narrow beam antenna 12 and which recurrently emits an impulse of electromagnetic radiation for detecting radar targets within the beam. This impulse of energy is conveniently termed a "main bang" and signals within the unit 10 which are indicative that a main bang is occurring are termed "main bang signals." These signals provide synchronization of all the electronic circuitry associated with the radar unit. A typical radar is generally discussed in "Radar and Electronic Navigation," G. J. Sonneberg, George Newnes, Ltd., London, 1951.

The emitted radiation is reflected by the radar targets (not shown) and returns to the antenna 12 with the time elapsed between the main bang and the signal return being representative of twice the distance between the antenna and the target and the propagation velocity of the radiation. A radar receiver 14 having a preset radar return signal discrimination level provides an electrical signal pulse on line 16 indicative of the reflected radar signal.

The just described apparatus is old in the art and generally well known. The present invention provides a digital means and methods of determining the exact location of a radar target providing the reflected radiation signal and displays a digitally constructed representation of that target on the face of a Plan Position Indicator (PPI) tube and permits the interstitial insertion of non-radar with radar data into the PPI tube in a manner where there is zero drift between the radar and non-radar data displayed on the PPI tube.

Figure 1A:
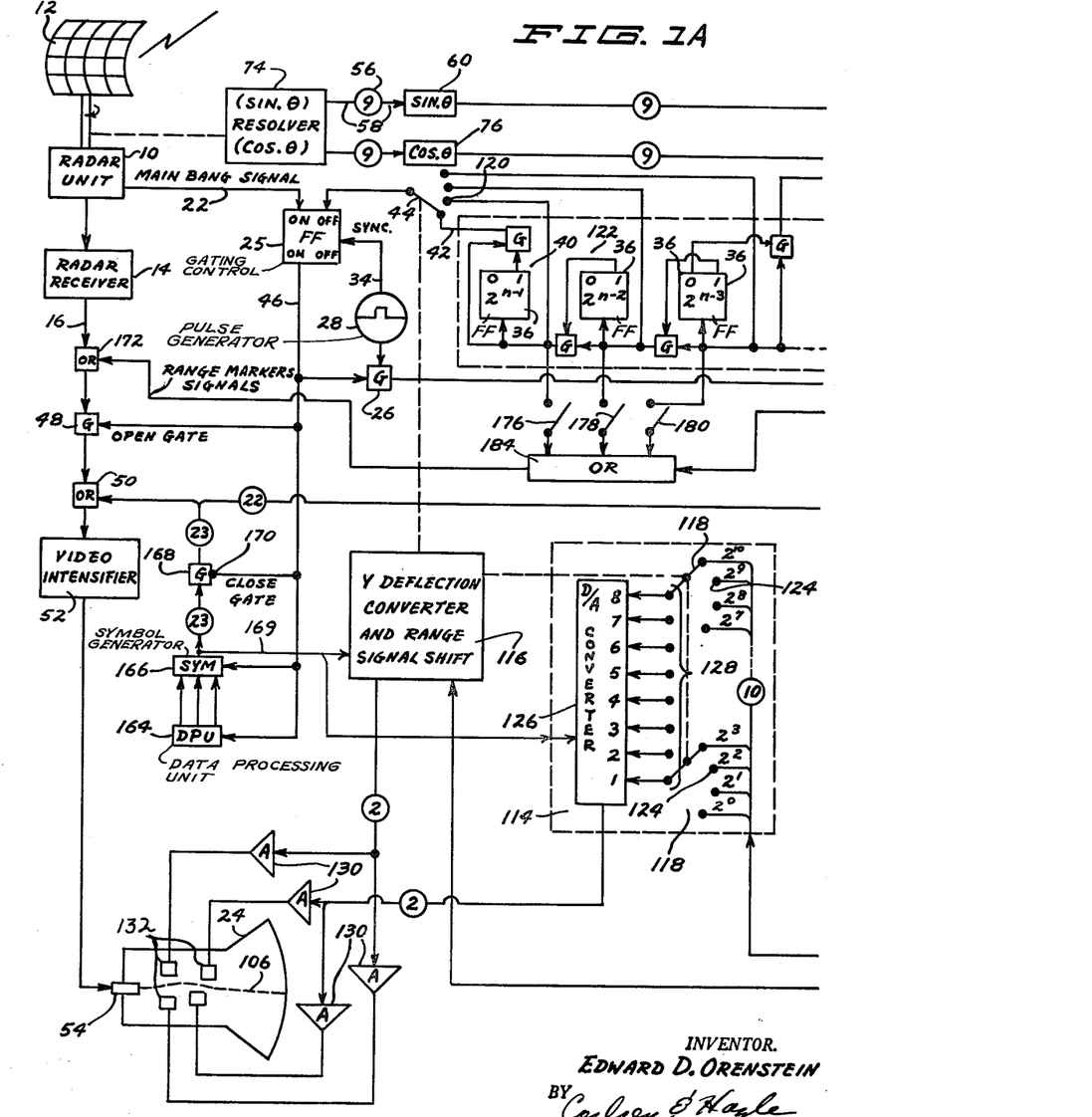
FIG. 1 is a schematic diagram of an exemplary embodiment of the present invention and is shown on two separate sheets as FIGS. 1A and 1B.
Figure 1B:
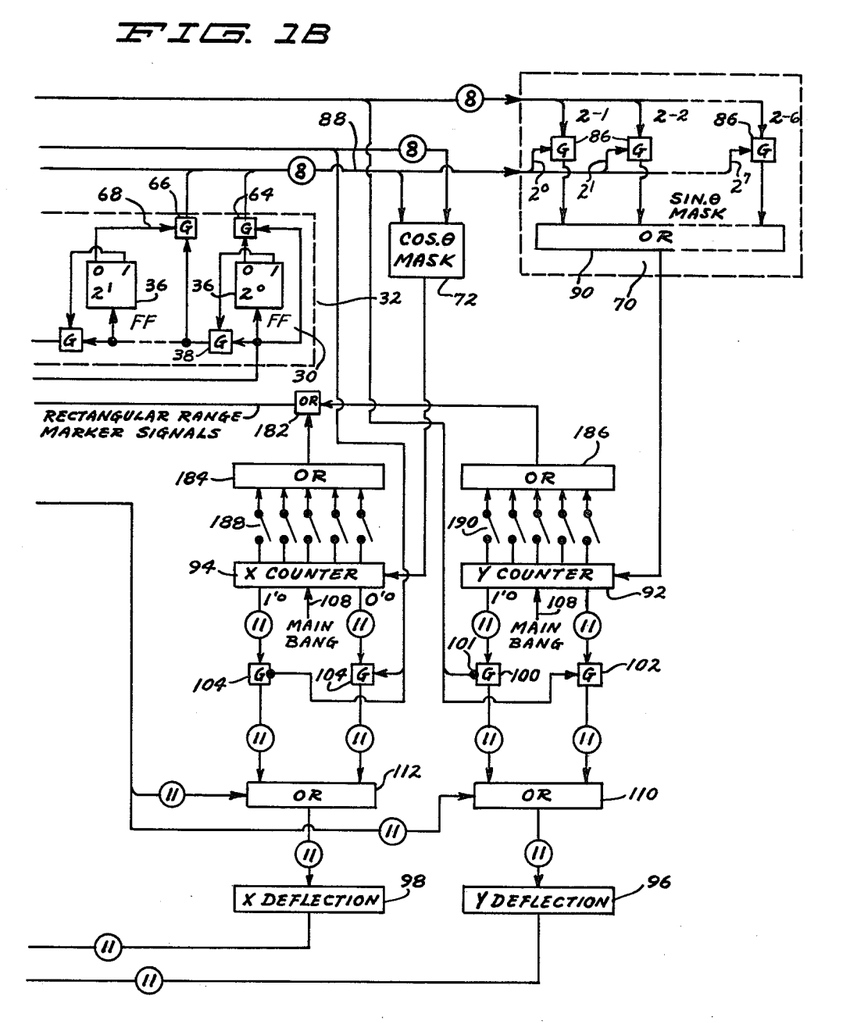
Figures 2, 3, 4, 5, 6:
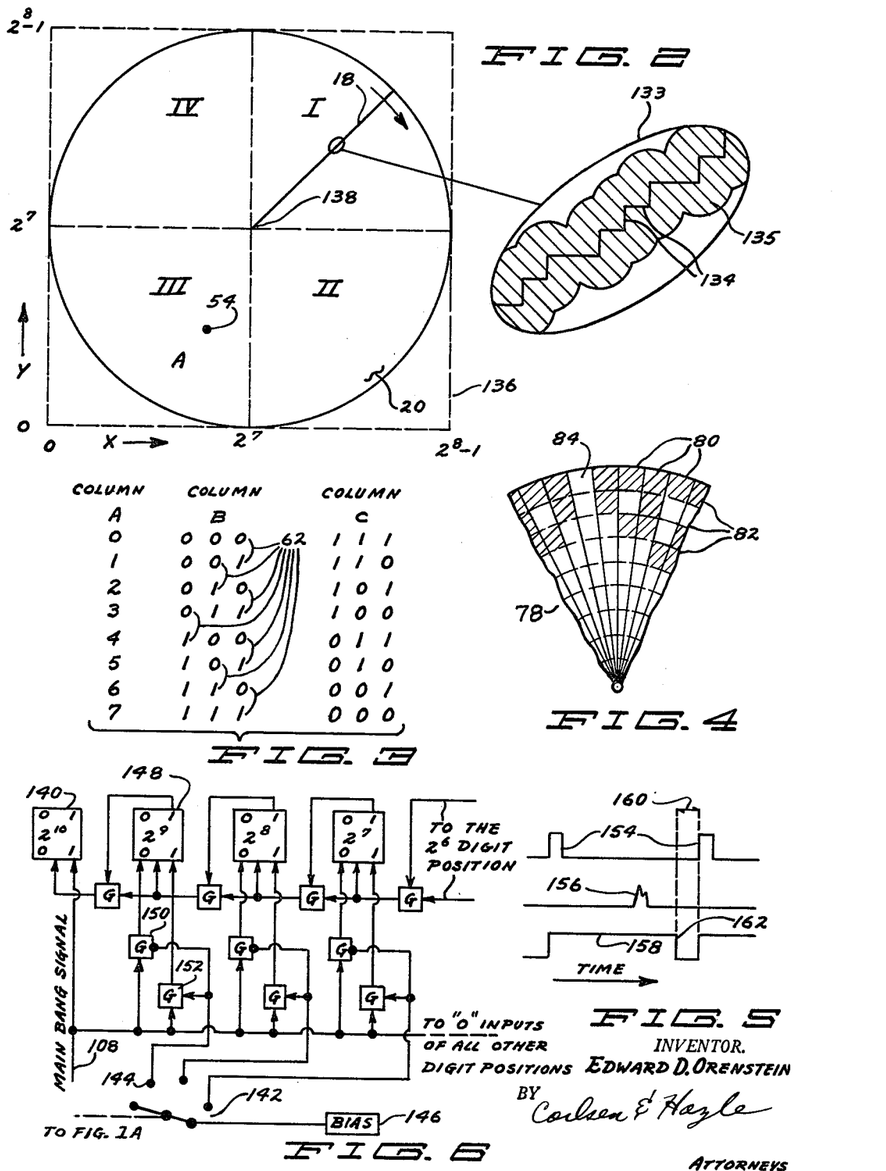
FIG. 2 is a diagrammatic showing of a PPI tube face with the theoretical deflection extremities of a rectangular deflection system and a portion of a digitally constructed radial PPI sweep.
FIG. 3 is a table showing the 0-1 transitions of a binary count from octal 0 to octal 7.
FIG. 4 is a diagrammatic showing of a cosine function disk portion for use with an antenna azimuth position to cosine resolver.
FIG. 5 illustrates some typical waveforms which may be expected during a single radial or range sweep including a time interstice between the range extremity and the successive main bang.
FIG. 6 is an abbreviated schematic diagram of an exemplary deflection signal counter illustrating a preferred way of centering the PPI axis of rotation on the tube face in various radial range selections.

The PPI display provided by this invention is identical in appearance to the previous displays in that the electron beam which creates the display on the face of the tube rotates in synchronism with an antenna 12 about the center of the tube face 20 as indicated in FIG. 2 by line 18. As in previous radar data display systems the main bang signal on line 22 from the unit 10 is utilized to initiate a radial or range sweep of the electron beam in tube 24. The signal on line 22 turns range sweep or gating control 25, which may be simply a flip-flop, to the "on" state providing a signal to open electronic gate 26. Pulses from range pulse generator 28 pass through gate 26 advancing the range counter 32 by toggling the least significant digit position (LSD) 30. Since the main bang signal occurs asynchronously with respect to the generator 28 impulses, control 25 may include some form of a resynchronization device (not shown) which utilizes a pulse, over line 34, to turn the opening gate signal of the control "on" for opening the gate 26. Such devices are well known in the digital arts and not being necessary to the successful operation of the present invention will not be further discussed.

The range counter 32 may be a typical additive or subtractive counter of "$n$" binary digit (bit) positions where the maximum range of the radar unit 10 is $2^n-1$ times the smallest quantized range unit as defined by the time displacement between any two successive impulses of generator 28.

The counter 32 has "$n$" digit positions each physically consisting of a bistable element 36 respectively indicative of numeric binary values each digit having a different numeric significance ranging from $2^0$ through $2^n-1$. As shown in FIG. 1B the LSD position 30 is recurrently toggled by pulses from the gate 26 providing in that position a modulo two counter. Carry gate 38 passes a pulse from gate 26 each time the digit position 30 changes from a "1" to a "0" indication and which is termed a "carry pulse." Higher order positions are like constructed to make a binary counter.

The counter 32 is operative to stop the range sweep PPI range or radial sweep 18 by routing a carry pulse from the most significant digit (MSD) position 40 over line 42 through range selector switch 44 thence to control 25 to turn it to the "off" state which blocks gate 26. It is apparent to those skilled in the art that the carry pulse from the MSD indicates that the counter has traversed a count equal to the counter modulus and thus is indicative of a full or maximum radial range count. Switch 44 is a carry pulse selector which selects a carry pulse provided by the $2^k$ digit position, where "$k$" is any arbitrarily selected integer, to provide selectable radial range presentations as will become apparent. PPI tube 24 deflection circuits follow the range selection in the counted range to automatically change the beam deflection rate to always provide a PPI idsplay covering the tube face 20.

When control 25 is in the "on" state a signal is provided over line 46 to radar video signal gate 48 permitting the receiver controlled video signals to pass through OR gate or buffer 50 and video intensifier 52 to provide an electron beam of temporary increased intensity from gun unit 54 for the duration of the received signals. Intensifier 52 is a video amplifier having controllable gain to provide a light blip or intensified spot 54 which may persist for one revolution of the PPI beam 18 and usually indicates a radar returned signal.

The PPI digital deflection control apparatus will now be described in full detail. For brevity and simplifying the drawing where a number of parallel transmitted digital signals occur, each respectively indicative of a different significant binary value, the plurality of conductors carrying such signals is indicated by a single line with an encircled number thereon. The number 9 at 56 indicates nine conductors in the line 58. In the connecting symbols such as symbol 60 it is understood that there are facilities, such as nine bistable circuits, for receiving and sending a signal over each individual conductor.

For brevity and clarity the circuit details utilized in the first embodiment are shown in logical block form, it being understood that any circuitry providing switching operations may be utilized. In "High Speed Computing Devices" by the staff of Engineering Research Associates, Inc., McGraw-Hill, New York, 1950, there are described several circuits suitable for embodying this invention. Chapter 3 "Counters as Elementary Components" describes bistable elements with a toggle input (page 15), set and reset (page 16) and a circuit for forming a radix 2 or binary counter as utilized in this invention. The gating operations in symbols such as indicated by numeral 48 may be of the dual grid type shown in FIG. 4-1a on page 37 while the gate indicated by a numeral 168 having a symbol 170 thereon indicates that the voltage at 170 has been inverted by a direct current amplifier. The latter effects a "negate" operation in that when a voltage is supplied which normally would cause the gate circuit to pass a signal the amplifier causes the gate to close, i.e., blocks signals from passing through the gate. The logical OR circuits, such as circuit 110 may be of the buffer type described in page 44 of the above reference.

Transistorized switching circuits such as the type shown in "Transistors I," RCA, March 1956, on page 634, et seq., may also be used in providing an embodiment of this invention.

The range counter 32 transfers range information in seriatim based on the "0" to "1" changes in state of the counter elements or flip-flops 36. In a binary count the 0-1 transition indicates the maximum numerical change occurring each time a binary one is added thereto. With reference now to FIG. 3 a count from 0-7 in octal is shown in column A while the corresponding count in binary is shown in column B. Arcute lines 62 indicate that in counting from an all 0 indication to an all 1 indication there is one and only one 0 to 1 change for each count advance. If the binary count were to be extended to "N" columns the same relationship of 0-1 changes occurs, i.e., only one 0-1 change per count advance, and that the transition is related to the significance of the digit position in which it occurs.

In counter 32 the 0-1 transition is detected by gating the digit position input signal with the "0" state signal from that position. For example, the 0-1 transition of the LSD position 30, is detected by gating the position input count signal from gate 26 with the position 30 "0" signal in gate 64. Similarly the 0-1 transition for the $2^1$ digit position (not shown) is detected by a gate 66 gating the signal from carry gate 38 (the toggle input signal to the $2^1$ digit position) with the "0" signal from the $2^1$ position on line 68. Higher order digit positions the handled in a like manner.

The seriatim signals indicating the 0-1 transitions of the counter 32 are masked with signals indicative of the sine and cosine of the antenna 12 azimuth in operational multipliers 70 and 72 to provide deflection voltages for PPI tube 24 in proportion to the radial sweep and the antenna azimuth. The azimuth data is provided by a digital resolver 74 of the commutator disk type operatively connected to antenna 12 to rotate therewith and provide digital signals indicative of the sine and cosine of the azimuth angle $\theta$ in nine bit (binary digit) accuracy to antenna angular position holding registers 60 and 76.

In FIG. 4 there is shown a portion 78 of a digital resolver commutator disk having angular radially extending segments 80 each covering an angular segment of the disk corresponding to the beam width of the antenna 12. Each segment is divided into nine radially displaced sections 82 with each section having a conductive or nonconductive coating corresponding to the sine or cosine of the azimuth angle represented by the segment. For example, North has been arbitrarily assigned a cosine value of zero, thus segment 84 having no conductive areas as indicated by the shaded sections corresponds to the antenna pointing North. By properly coating a binary code on a disk a complete sine and cosine function for an antenna rotation of 360° is provided, one disk for each function. Electrical wiper contacts (not shown) are conveniently used to complete an electrical circuit to take the binary code from the disk. Such shaft position to digital converters are well known in the art and no further discussion herein is felt necessary.

With reference again to FIG. 1 the registers 60 and 76 each provide the digital representation of sine and cosine, respectively, in the form of 8 bits of significance plus a sign bit, the sign being necessary to indicate the quadrant. The eight significant bits are directed to the respective masks 70 and 72 for masking the 0-1 transition signals from counter 32. Each of the masks may be constructed in the same manner, the sin θ mask only being explained with the understanding the cos θ mask operates in an identical manner.

In mask 70 there are eight electronic gates or AND circuits collectively designated by numeral 86 and which are identified with the significance of the sin θ digits from $2^{-8}$ through $2^{-1}$. Eight lines 88 from the counter 32 each respectively connected to the $2^0$ through the $2^7$ digit positions for carrying the 0–1 transition signals therefrom are connected respectively to gates 86 in inverse order of relative significance to the sin θ digits. The outputs of each gate 86 are mixed with the other gate output signals in OR circuit or diode mixer 90. The numerical effect of circuit 70 is to multiply the 8-bit range count from the counter 32 by the sine of the antenna 12 azimuth as the radial range is being counted as will become apparent. At any given range the total number of output signals from OR circuit 90 occurring since the last main bang signal of unit 10 respresent the abscissa in rectangular coordinates of the polar coordinate or radially counted range. Similarly the mask 72 provides the product of the cosine of the angle with range to obtain the ordinate representation in rectangular coordinates of the polar coordinate counted range.

The numerical effect of mask 70 is that of the well-known rate multipliers and will now be explained. The sin θ signals from the register 60 change at a much slower rate than the range signals on the line 88 such that the sin θ signals can be considered as being constant for the purposes of explanation. As such, the sin θ signals are the multiplier and act as the controlling element in the mask. The mask will operate only if the numerical representation in the controlling element is less than unity. The function of the gates 86 is to mask out or block selected signals on line 88 for providing a number of signals to the OR circuit 90 which is in proportion (rate product) to the binary fraction indicated by the signals from the sin θ register. For example, if the sin θ equals one-half, then the mask 70 will pass only one-half the signals from the line 88 to the counter 92. As the sin θ varies the rate at which pulses will be transferred to the counter 92 is varied in proportion to such value. When the sin of θ equals unity, the number to the left of the decimal or binal point is treated as a sign bit and not a part of the numeric value thereof.

It should be noted that the least significant signal from line 88 is masked with the most significant signal of the sin θ. Similarly the other digit positions of the respective numbers are arranged in mutually inverse order of significance in order to provide rate multiplication. It should be apparent that the most significant sin θ digit position should have the greatest effect on the Y counter 92. Since the least significant digit position of the counter 30 provides the greatest number "0" to "1" transitions it should be masked with the most significant sin θ digit position for transferring a proportionate number of digital signals to the counter 92. As a simplified example consider the $2^{-2}$ and the $2^{-1}$ sin θ digit positions as masking respectively the $2^1$ and $2^0$ range signal digit positions. Assume that the sin θ equals one-half which is .10 $(1 \times 2^{-1} + 0 \times 2^{-2})$ in binary notation. For a full radial range count the respective digit positions will have the binary values as indicated in the table below:

| Range | | Sin θ | |
|---|---|---|---|
| $2^1$ | $2^2$ | $2^{-1}$ | $2^{-2}$ |
| 0 | 0 | 1 | 0 |
| 0 | 1 | 1 | 0 |
| 1 | 0 | 1 | 0 |
| 1 | 1 | 1 | 0 |

From inspection of the above table and in view of the FIG. 1B illustrated mask 70, it should be apparent that there are two "0" to "1" transition in the $2^0$ digit position, the mask 70 passes two pulses to the counter 92 which is equal to one-half the number of pulses supplied to the mask. Similarly if $2^{-1}=0$ and $2^{-2}=1$ only one pulse, or one-fourth of the total input pulses, will be passed by the mask 70. By carrying the simplified example out to any number of digit positions it can be clearly shown that where the control element indicates a number less than unity that the number of pulses passed by the mask 70 will be in proportion to the value indicated by the controlling element or sin θ. In the above manner the two masks 70 and 72 respectively modify the radial range count to provide respectively in the counters 92 and 94 sets of digital signals providing a numerical counting rate indicative of the ordinate and abscissa coordinates of the increasing radial range distance at the particular antenna azimuth. Remember the range counter is continuously increasing its range count and therefore the counters 92 and 94 count correspondingly at a rate equal to the range count rate as modified by the sine or cosine of the antenna azimuth.

From the above noted discussion and a consideration of FIG. 4, it will be apparent to one skilled in the art that a suitably coded output from a resolver, indicated by reference numeral 74 on FIG. 1A, may be utilized to control the operation of the sine and cosine masks 70 and 72 on FIG. 1B. The illustrative example in FIG. 4 is that of a cosine resolver coding disc which is drivingly connected, through suitable driving means, so that it will properly indicate the azimuth position of the rotating radar antenna. The binary digital information obtained from 8 of the 9 radially concentric channels on the disc is utilized to control the operation of the sine and cosine masks. The sign information obtained from the 9th radially concentric area is utilized to control the output of the X and Y counters 92 and 94 in accordance with the quadrant, as indicated by the sign, of operation of the antenna. The relative position and significance of the conductive areas on the coded disc 78 are, of course, determined by the manner in which the signals are utilized in the sine and cosine masks to control the relative numbers of radial range pulses applied to Y and X counters 92 and 94 respectively. The example noted above in which a multiplication function is obtained by multiplying the radial range pulse output by the azimuth signal is an example of one arrangement for suitably modifying the radial range pulse count in accordance with azimuth to obtain digital signals representing the azimuth of an antenna such as the radar antenna shown in the illustrative embodiment of FIGS. 1A and 1B. In the example of FIG. 4, it may be observed that there is symmetry existing about segment 84 (which is arbitrarily designated as having a cosine value of 0). On either side of segment 84 it may be noted that the binary coding follows the binary progression from 0 to 0011, 0101, 0111, 1001 and 1101 to correspond, for example, to the cosine values represented as indicated above by the corresponding binary fractions. Application of control signals to the masks 72 and 90 with suitable correspondence between the binary digits and the gates 86, results in control of the output of the masks to their respective X and Y counters.

Note the range counter 32 has considerably greater modulus than the resolver 74. Therefore at maximum range count the lower 8 bit positions of counter 32 will provide several cycles of count to masks 70 and 72 to digitally construct the radial sweep on the PPI tube 24 as will become apparent.

The effect and the only purpose of the masks 70 and 72 is to vary the rate of the X and Y deflection with the azimuth of the antenna 12 to provide a rotating PPI sweep. The series transmitted signals from the masks respectively to Y-counter 92 and X-counter 94 are accumulated by the counters to construct a digital count representative respectively of the abscissa and ordinate coordinates corresponding to the radial range count of counter 32 at the azimuth of antenna 12. The significance of the bits processed by the masks 70 and 72 relates to the angular accuracy of the rotating sweep in the PPI and the presented range accuracy. The modulus of counters 92 and 94 is not related to the resolver 74 accuracies but for consistency is equal to the range counter 32 modulus, and in this illustration is arbitrarily chosen as eleven bits.

The range indications in the counters 92 and 94 are gated respectively to Y-deflection register 96 and X-deflection register 98 in a manner facilitating insertion of non-radar data between radar sweeps as will be explained. Both the 0 and 1 signal indications are taken and gated by the sign of the sine and cosine signals provided from resolver 74 indicative of the quadrant the antenna 12 is pointed as best understood with reference to FIG. 2 according to the following truth table:

| Quadrant | Sign | |
|---|---|---|
| | Sine $\theta$ | Cosine $\theta$ |
| I | plus | plus |
| II | minus | plus |
| III | minus | minus |
| IV | plus | minus |

The sign bit of sin $\theta$ is provided from register 60 to gates 100 and 102 each which represent eleven individual electronic gates. The signal so provided is operative to close gates 100 as indicated by symbol 101 and to open the gates 102 when the bit is indicative of a minus sign, and vice versa when the sign is positive. Output gates 104 of counter 94 are like connected to the cos $\theta$ register 76 and operate in an identical manner. The effect is that when the "1" signals are passed the count transferred to the deflection registers appears to progress from an all 0 to an all 1 representation. When the "0" signals are passed and used to indicate a binary "1" the count representation is complemented in 1's complement notation and therefore appears to progress from an all "1" to an all "0" representation as indicated in column C of FIG. 3. The purpose of this is to provide a rotating PPI sweep centered on the face of the tube as will be later explained.

With reference to FIG. 2 with both deflection registers 96 and 98 containing all "0" signals the electron beam 106 of tube 24 is deflected to point 0—0 which is off the tube face 20. To provide a tube centered reference the most significant digit of each counter is set to a "1" which in FIG. 2 corresponds to $2^7$ for the abscissa and $2^7$ for the ordinate. Therefore when the main bang signal from unit 10 turns control 24 to the "ON" state the counters 92 and 94 are both preset to respectively have the values in binary code 10 000 000 000. The connection of the main bang signal to these counters is collectively indicated by arrows 108 and will be more fully explained later. As the range is counted in quadrant I the deflection of the beam 106 must have an increasing deflection and thus the range is added to the centered value. Now in quadrant III the above mentioned present binary code in 1's complement notation is 01 111 111 111 and as signals from the masks 70 and 72 are added to the counters 92 and 94 the effect is to reduce the overall 1's complement notation value and thus move the radial sweep toward the tube face periphery in quadrant III, i.e., the counters appear as subtractive counters. Quadrants II and IV are handled in a similar manner.

The signals from the output gates 100 and 102 are passed through OR circuit 110 and inserted in Y-deflection register 96. Similarly the output signals of gates 104 are passed through OR circuit 112 to the X-deflection register 98. The output signals of the deflection registers are respectively provided to digital-to-analogue converters and range signal shifters 114 and 116 which change scale of the digital signals according to the setting of range selector switch 44 and drive the CRT deflection plates to provide the PPI display. Since both converter-shifters are preferably constructed in the same manner only one will be described.

Since switch 44 provides four ranges to be displayed on tube face 20 the data signals from the deflection register 98 are switched to provide the same size display for different radial ranges. In a digitally controlled sweep there are at least two ways of providing different ranges on a single PPI tube. A first way would be to vary the deflection sensitivity and thus provide a different magnitude deflection for like significant digit positions in the deflection registers. A second and preferred method of varying the range is to vary the counting rate in the deflection system. This is easily accomplished by effectively shifting the digitally represented data with respect to the digital-to-analogue converter 126 by moving the arms of switches 118 with switch 44 to select digit positions from the deflection registers of different significance. In the positions shown switches 44 and 118 have selected the maximum range presentation thereby utilizing only the eight most significant digit positions and ignoring the least three significant digit positions of the registers 96 and 98. Thus the radar range presented on the PPI is from eight range units radially from the antenna 12 to the maximum range. Therefore in the illustration the area within eight quantized range units of the antenna is not presented which is usually not an important area to be viewed when one is viewing a presentation representing several miles in radius.

By moving the switch 44 to terminal 120 the carry pulse from the second most significant counter digit position 122 is used to terminate the radial sweep cutting the range presentation to one-half maximum. Switches 118 are correspondingly moved to the second terminal 124 and each of the eight inputs 128 to the converter 126 receives data from the next less significant digit position from the register 98 and thus at twice the pulse rate of the data that was received in the maximum range selection. It is apparent that the range coverage is moved closer to the antenna an amount equal to one-half the previously skipped distance or to within four range units from antenna 12. Other shorter ranges are provided in a like manner. It may be noted that the maximum number of bits converted to a deflection voltage by digital signal to analogue voltage converter 124 is equal to the number of bits in the deflection registers 96 or 98 less the number of range selections minus one. Of course fewer bits may be utilized in providing the deflection voltages with a corresponding decrease in presentation accuracy.

It is understood that any of the illustrated switches such as 44 and 118 may be replaced by electronic gates.

The digital-to-analogue converter 114 may be of any usual type, this not being a critical part of this invention. It is believed these devices are sufficiently well known in the art to require no further elaboration. The electrical analogue voltage provided by converter 114 indicative of the binary code presented on the eight input lines 128 each of which is connected to a separate switch 118 for connection to one of four successively significant digit position of register 98 according to the following table:

| Converter Input Position | Deflection Digit Position Connection Exponent of the Binary Digit Value | | | |
|---|---|---|---|---|
| | Range I | Range II | Range III | Range IV |
| 1 | 0 | 1 | 2 | 3 |
| 2 | 1 | 2 | 3 | 4 |
| 3 | 2 | 3 | 4 | 5 |
| 4 | 3 | 4 | 5 | 6 |
| 5 | 4 | 5 | 6 | 7 |
| 6 | 5 | 6 | 7 | 8 |
| 7 | 6 | 7 | 8 | 9 |
| 8 | 7 | 8 | 9 | 10 |

The output analogue output voltages from the converters 114 and 116 are provided in push-pull, that is two voltages are provided, one positive going and a second negative going and both being the analogue of the digital signals converted. The output voltages are amplified by amplifiers 130 and applied to the deflection plates 132 of tube 24 to deflect electron beam 106 to a spot on the tube face 20 (FIG. 2) corresponding to the digital signals.

It is apparent that as the range presentation is changed the digit positions in the counters 92 and 94 indicating the PPI tube center are also changed requiring that the main bang signal indicated by the arrows 108 be rerouted to set digit positions of different numeric representations to a "1" indication. With reference now to FIG. 2 the dashed square 136 represents the deflection extremities of the electron beam deflection for eight input bits to the X and Y deflection circuits while the center 138 corresponds to a deflection caused by signals indicating $2^7$ or half-way in the X and Y directions. This value corresponds to a selected one of the X and Y counter digit positions $2^7$ through $2^{10}$ depending on the range selection.

With reference to FIG. 6, exemplary means are shown for adjusting the counter settings to correspond to the range selection. Counter 92 is identical to counter 94, therefore one explanation will suffice for both. Firstly it may be noted that in the shorter range selections the digit positions of more significance that the digit position connected to input 8 or the most significant input of converter 126 may be disregarded. Accordingly the main bang signal indicated by line 108 is permanently routed to the "1" input of the MSD position 140 of the X-counter 94. When range switch 44 (FIG. 1A) is moved to terminal 120, switch 142 (FIG. 6) operatively connected thereto is moved to terminal 144 to provide a bias voltage from source 146 for digit position 148 input gates 150 and 152, closing gate 150 and opening gate 152. Each main bang sets the digit position 148 to a "1" indication thereby permitting a centered rotating PPI beam in the second range selection to one-half maximum range. As switch 44 is used to select yet other ranges switch 142 is correspondingly changed to set the appropriate X-counter digit positions to a "1" resulting in a tube face 20 centered rotating PPI display beam 18 in each range selection.

The type of radial sweep provided by the just described digital deflection system is indicated in FIG. 2 wherein a portion of the rotating beam 18 is enlarged at 133. As the sine and cosine function modified range count from the masks is provided to the deflection registers, the deflection voltages resemble a variable staircase voltage waveform with the size and length of the voltage steps 134 varying according to the digital notation of the sine or cosine function at the antenna azimuth, each azimuth having a different staircase. In the illustrated system the resolution of the tube face 20 is approximately three times the deflection quantum provided by the least significant digit position of the converters 114 and 116. Shaded area 135 shows the effect on the beam 18 to construct same by the just described digital methods and it should be understood that the portion 133 is greatly enlarged and in actual practice the beam 18 appears in all respects to be a straight uniformly constructed rotating PPI beam representation. The effect of a radar return on the beam is to intensify the beam at a particular spot as indicated at 54 and is the usual practice in constructing and operating PPI display systems.

The insertion of non-radar digital data in radial sweep time interstices will now be described. With reference to FIG. 5 numeral 154 denotes two successive main bang signals from unit 10 while a typical radar return signal 156 from receiver 14 is shown as being received while the control 24 "ON" signal 158 on line 46 is enabling the video gate 48. The time length of signal 158 represents the duration of the radial or range sweep corresponding to beam 18. This signal varies in length with the selection of ranges by switch 44 but in any event there is a predetermined sweep time interstice 160 between the trailing edge 162 of signal 158 and the leading edge of the next main bang. During this time interstice the PPI tube 24 is normally inactive and it is during this time that the non-radar data may be conveniently inserted on tube face 20.

With reference again to FIG. 1 a typical source of non-radar data to be presented on a PPI tube 24 is shown as being an electronic digital real time computer 164 which may process radar derived data to produce non-radar data which should be presented in correlation with the radar data, as an airplane identification code for example. The electronic digital computer or data processing unit 164 can be of any conventional type such as described in "Automatic Digital Calculators," Booth and Booth, Academic Press, London, 1956. For convenience the unit 164 may be connected to a digital symbol generator 166 such as described in the copending application Serial Number 812,384, filed May 11, 1959, entitled "Data Display System" and assigned to the assignee of this invention. In any event the output digital signals from either the symbol generator or the computer are presented with the non-radar video signal on one conductor and the deflection signals in rectangular coordinate representation in a modulus not exceeding the modulus of the deflection registers 96 and 98, each digit position signal being on a separate conductor. In this illustration 23 conductors are provided from symbol generator 166 to non-radar data gates 168 which are closed by the control 24 signal indicating a radial sweep and is opened at all other times as indicated by the negating symbol 170 connecting line 46 to the gate symbol.

The control 24 signal on line 46 may be also provided to the computer 164 and the symbol generator 166 to provide control information to enable those devices to send data signals to gate 168 only when it is open. The data signals passing through gate 168 are inserted into video intensifier 52 to brighten the electron beam and into the X and Y deflection registers respectively through the OR gates 110 and 112 to obtain proper deflection. The generator 166 provides a series of ordinate and abscissa coordinate signals during a single time interstice to write a symbol on the tube face 20, such as the FIG. 2 symbol "A" which is formed by analogue voltages provided to the converters 114 and 116 over the lines 169 and as described in the referenced copending application.

It is apparent that as the range switch 44 is operated to change the range presentation of the radar data the converters 116 and 118 are also operative to change the scale of the non-radar data coming through gate 168 to correspond with the selected range. Further since the location of a radar target is digitally defined on the PPI tube face 20 and the location of the non-radar data symbol thereon is similarly defined there is no drift between the data symbols due to component value variations. Any drift in the deflection circuits effects both data symbols alike and barring complete failure of a digit position or failure of the computer to properly track the radar target the directly associated non-radar and radar data presented on tube face 20 remains in the same relative positions.

In a PPI display it is highly desirable to provide radial range markers in the form of circles concentric with the tube face center point 138 formed by brightening the beam 18 at selected radial range points. To provide such a polar coordinate range marker selected carry pulses from the range counter 32 may be routed into the video intensifier 52 through OR circuits 172 and 174 to be mixed with the received signals from receiver 14 to brighten the beam 18. A one-half maximum range marker is conveniently provided routing the carry pulse from digit position 122 which is indicative that the range count is one half maximum by closing switch 176. Additional range markers may be provided by like connecting carry pulses from digit positions having less numeric significance respectively through polar coordinate range selection switches 178 and 180. For example, the carry pulses from the $2^{n-3}$ and $2^{n-4}$ digit positions respectively divide the maximum range indication into four and eight parts. The carry from the $2^{n-3}$ position provides three one-fourth maximum range polar coordinate markers in the form of three concentric circles, one at the one-fourth, one at one-half, and one at three-fourths maximum range. It may be noted that the range selection also changes the positions of the polar range markers to automatically correspond to the PPI presented range.

To facilitate coordination between air and ground systems it is desirable to provide grid range markers in the form of squares which may be related to a map of the radar scanned area for rapid translation from radar polar coordinates to ground rectangular grid coordinates, such coordinates being automatically adjusted with the range selection changes. The technique of utilizing counter carry pulses to generate range markers may be adapted to the X and Y counters 92 and 94 whose counts are directly indicative respectively of the vertical and horizontal deflection on the PPI tube face 20. Such selected carry pulses from both counters are mixed in OR circuit 182 from OR circuits 184 and 186 and further mixed with the polar coordinate range marker signals in circuit 174 to be provided to video intensifier 52 for generating the range marker presentation which may include both polar and rectangular markers. Switches 188 are connected to the counter 94 carry pulse sources in the same manner as described for the counter 32 while digital signal selector switches 190 select the carry pulses from counter 92. It is apparent that as the switch 44 changes the radial range selection to change the scale of the PPI presentation the display tube distance between adjacent map grid or rectangular coordinate range markers is likewise changed and limited to radar scanned area presented.

The range markers hereinabove described may be conveniently identified on the tube face 20 by providing digitally constructed symbols from generator 166 immediately adjacent each range marker, providing a completely integrated display of the radar scanned area.

It is understood that suitable modifications may be made in the structure as disclosed provided such modifications come within the spirit and scope of the appended claims. Having now therefore fully illustrated and described my invention, what I claim to be new and desire to protect by Letters Patent is:

1. For connection to a radar unit having a rotating antenna and providing a timing signal, polar coordinate digital range counting means responsive to a timing signal for counting a predetermined number of discrete range units and providing signal indications of the count, a digital resolver for being operatively connected to a radar unit antenna and providing a plurality of digital signals indicative of the sine and cosine of the antenna azimuth angle, means responsive to said range counting means signals and to the resolver signals for providing two trains of digital signals respectively indicative of the ordinate and abscissa equivalents of a counted number of range units, and a PPI display means responsive to the said two trains of signals for providing a radar scanning display beam.

2. For connection to a radar type unit having a rotating antenna and providing a timing signal, control means includig pulse generation means providing recurrent impulses indicative of range and being responsive to the timing signal to start a single radial sweep, a range counter having a plurality of digit positions and receiving pulses from said control means for counting a range, separate means connected respectively to each counter digit position for detecting a "0" to "1" numeric representation transition and providing a signal indicative thereof, a digital resolver for being operatively connected to an antenna and providing a plurality of digital signals indicative of the sine and cosine of the antenna azimuth, two electronic masks gating the transition indicating signals with the sine and cosine indicating signals of inverted order numeric significance and mixing the gated signals in each mask to form two trains of digital signals respectively indicative of the ordinate and abscissa of the radial range, X and Y range counters respectively receiving said signal trains and accumulatively counting same during one radial sweep, and a display means having vertical and horizontal deflection circuits respectively responsive to said accumulative count signals to provide a digitally constructed range indication.

3. For digitally constructing a rotating PPI beam which is synchronous with an antenna rotation, digital radial range counting means for providing range indicating digital signals, digital sine and cosine antenna azimuth resolving means for providing digital sine and cosine signals each indicative of antenna azimuth in the form of a signed numeric value, two mask means operatively and respectively connected to receive the numeric value portions of the sine and cosine signals and masking same with a like number of range indicating signals each providing a train of pulses the rate of which is indicative of the antenna angle in any one of four azimuth quadrants, two digital counters each preset for every radial range count to one-half the maximum range count and each being of the same modulus as the radial range counting means for counting the signals from the masks, gating means for passing signals indicative of the count in said two digital counters and responsive to the signed signals of said resolving means for complementing the said passed signals when the signed signals indicate a minus numeric value, and display means including a cathode ray tube and means responsive to the gated signals for controlling the cathode ray tube whereby the electron beam therein is caused to rotate about an axis thereof.

4. For connection to a scanning radar unit having a rotating antenna and a timing signal indicative of the emission of a radar signal, means responsive to a timing signal for digitally counting a predetermined radial range and providing signals indicative of the count, sine and cosine digital resolving means including separate digital signal holding means respectively for the digital signals indicative of the signed numeric values thereof, a pair of masking gate means respectively enabled by the sine and cosine numeric value indicating signals for gating range count indicating signals in inverted order of numeric significance and respectively combining the sine and cosine gated signals on two separate lines, X and Y counters respectively counting the gated signals on the separate lines and each having two sets of output gates respectively enabled by the "0" and "1" indicating signals, the output gates being respectively connected to the sign portion of the sine and cosine signals such that the "0" gates are opened when the sign is minus and the "1" gates are opened when the sign is plus, a pair of deflection signal holding registers respectively connected to both the "0" and "1" signal gates of the X and Y counter, and a cathode ray display system including digital signal to analogue voltage conversion means for providing deflection voltages proportioned to the numeric values indicated by the signals in the deflection registers.

5. For use in a PPI display system, a pulse generator providing recurrent electrical impulses having a time displacement between successive impulses indicative of a quantized radial range, a digital counter having plurality of digit positions and generating carry pulses for advancing the numerical count, gating control means responsive to an external signal for passing pulses from the generator to the counter for generating a radial range count, display means responsive to the counter for digitally deflecting a centered radially rotating beam on a PPI display, and a multi-position switch selectively connecting carry pulses from different digit positions of the counter to the gating control means for blocking the pulses to terminate the radial digitally constructed sweep.

6. Apparatus as in claim 5 wherein the multi-position switch is operatively connected to the display means for digitally changing the scale of the display to correspond to the numeric significance of the selected carry pulse.

7. For use in a radar PPI display system, a pulse generator providing recurrent electrical impulses having a time displacement between any two successive impulses indicative of a quantized radial radar range, a digital counter having a plurality of digit positions and providing inter-digit position carry pulses, means in the counter for indicating the digit position of greatest significance having a change therein for each count advance, gating control means responsive to an external timing signal for passing impulses from the generator to the counter for generating a radial range count, a digital resolver for providing signals indicative of the sine and cosine of an antenna angle, means for gating the most significant change in the counter for each count advance respectively in inverse order to the digit position signals indicating the sine and cosine, two counters respectively counting the number of gated signals, two multi-position switches, one of the switches being connected between the digital counter and the gating control means for selectively passing carry pulses from selected ones of the digit positions to turn off the control means to vary the length of time of the count and therefore vary the presented radial range, the second multi-position switch for connecting an external timing signal to selected digit positions of the said two counters for providing an initial count signal in each indicative of one-half maximum deflection for the selected range, two deflection registers respectively receiving signals from the two counters, display means including a deflection voltage system for providing a display centered rotating PPI beam, and data shifting means variably connecting the deflection registers to the display means according to the range selection such that the most significant inputs of the display are connected respectively to the said selected digit positions.

8. Apparatus as in claim 7 and further providing a digital signal selector connected to the said two counters for passing selected digital signals therefrom to a single line, carry pulse selection means connected to said digital counter to pass selected carry pulses to said single line and the display means being further responsive to the digital signals on said single line for providing range markers on the display.

9. Apparatus as in claim 7 and further including signal buffer means between the counters and the data shifting means, and non-radar means responsive to the said gating control means for providing digital signals to the deflection registers through said shifting means during the time interstice following the carry pulse of the selected one digital counter digit position and the successive timing signal.

10. Apparatus as in claim 9 and further including radar signal receiving means, non-radar data signal generating means, and means responsive to the gating control means for selectively gating the radar signal and non-radar signals to the display means respectively concurrently with the radar and non-radar means provided deflection signals.

11. For use in a PPI display system, a pulse generator providing recurrent electrical impulses having a time displacement between successive impulses indicative of a quantized radial range, a digital counter having a plurality of digit positions and generating carry pulses for advancing the numerical count, gating control means responsive to an external signal for passing pulses from the generator to the counter for generating a digital radial range count, carry pulse selection means for routing selected carry pulses to a common line, display means responsive to the counter for digitally constructing a PPI display centered radial rotating beam and further responsive to the carry pulse selection means for constructing concentric display centered circles indicative of predetermined radial ranges, and a multi-position switch means selectively connecting carry pulses from different counter digit positions to the gating control means for blocking the generator pulses terminating the digitally constructed sweep.

12. For use in a PPI display, a pulse generator providing recurrent electrical impulses having a time displacement between successive impulses indicative of a quantized radial range, a digital counter having a plurality of digit positions and generating carry pulses for advancing the numerical count, gating control means responsive to an external signal for passing impulses from the generator to the counter for generating a digital radial range count, an angle resolver providing sine and cosine digital signals, means responsive to said digital counter and to the resolver for providing two sets of digital signals respectively indicative of the ordinate and abscissa of the counted radial range, a digtal signal selector connected to the latter means for selectively passing digital signals of predetermined significance to a single line, and display means responsive to the two sets of digital signals for providing deflection voltages for providing a display centered rotating PPI beam and further responsive to said digital selector single line signals for providing rectangular range markers on said display.

13. For use in a PPI display, a pulse generator providing recurrent electrical impulses having a time displacement between successive impulses indicative of a quantized radial range, a digital counter having a plurality of digit positions and generating carry pulses for advancing the numerical count, gating control means responsive to an external signal for passing impulses from the generator to the counter for providing a digital radial range count, a digital angle resolver providing sine and cosine digital signals, means responsive to said digital counter and to the resolver for providing two sets of digital signals respectively indicative of the ordinate and abscissa of a counted radial range, a digital signal selector connected to the latter means for selectively passing digital signals of predetermined significance to a single line, a carry pulse selector connected to the counter to pass selected carry pulses to said single line, and display means responsive on the signals on said single line for providing range markers on a PPI display.

14. For connection to a radar unit having a rotating beam of recurrent signals and having a timing signal, digital range counting means responsive to the timing signal for counting a predetermined number of discrete range units and providing signal indications of the count, means for being operatively associated with the radar unit and providing a plurality of digital signals indicative of the sine and cosine of the beam angle, digital numerical means responsive to said range counting means signals and to the angle means signals for providing two trains of digital signals respectively indicative of the products of said sine and cosine signals with the range signals, and digital display means responsive to the trains of signals whereby a rotating digitally constructed indicating beam is formed.

15. For connection to a radar unit having a rotating beam of recurrent signals and having a timing signal, digital range counting means responsive to the timing signal for counting a predetermined number of discrete range units and providing signal indications of the count in the form of transitions from one to the other binary state, means for being operatively associated with the radar unit and providing two sets of quasi-static digital signals respectively indicative of the sine and cosine of the beam angle in the form of sign and magnitude, two separate digital and numerical means responsive to said range counting means signals and to the angle magnitude signals for respectively providing two trains of digital signals indicative of the products of said sine and cosine magnitude signals with the range signals, two counters for respectively accumulatively counting said signals in the trains, output means connected to the respective counters and to the sign signals for modifying the signal counts according to sign of the respective sine and cosine signals, and digital display means operatively connected to the output means for providing a digitally constructed range indication.

16. For connection to a radar unit having a rotating beam of recurrent signals and having a timing signal, digital range counting means responsive to the timing signal for counting a predetermined number of discrete range units and providing signal indications of the count, means for being operatively associated with the radar unit and providing a plurality of digital signals indicative of the signed sine and cosine numbers indicating the antenna beam angle, masking means responsive to said range counting means signal indications and to the angle means signals unsigned portions for respectively providing two trains of digital signals indicative of the products of said sine and cosine signal unsigned portion with the range signals, X and Y counters respectively counting the product trains of digital signals and each providing binary "0" and "1" output signals indicative of the accumulative count, output gates connected to the counters and to the means for providing digital beam angle signals such that when the respective sign is positive the "1" output signals are passed and when the sign is negative the "0" output signals are passed, and display means including digital signal to analogue signal converter means and range scaling means for providing a display positioned in proportion to said accumulative counts.

17. The method of digitally constructing a PPI display beam which moves synchronously with a rotating beam of recurrent signals, comprising recurrently digitally counting a range number having a plurality of digits of different assigned numeric significances and being indicative of a displacement, providing signals in seriatum based on said count respectively to a like plurality of signal lines each of which is assigned a numeric significance with a signal on any given line being interpreted to indicate a predetermined count has been transversed, comparing digit for digit the series of signals with a pair of quasi-static sets of digital signals in inverse order of relative significance for forming two trains of signals respectively indicative of the products, summing the signals in each train and modifying the sums by respective constants for providing deflection voltage indicating sets of signals having a predetermined reference in a display, and using the latter signal sets to control deflection voltages in an electronic display system.

18. In combination with radar apparatus including a rotating antenna and a timing signal; polar coordinate digital range counting means responsive to said timing signal for providing a signal output indicative of a predetermined number of discreet range units; a digital resolver operatively connected to said antenna, said resolver providing a plurality of digital signals indicative of the sine and cosine of the azimuth angle of said antenna; means responsive to the output of said range counting means and to said resolver for providing a pair of digital signals indicative of the ordinate and abscissa equivalents of the counted number of discreet range units; and display means for providing an indication thereon of the azimuth of said antenna in response to said digital signals.

19. In combination with a radar apparatus including a rotating antenna and a timing signal; control means including pulse generation means providing recurrent pulses indicative of range and being responsive to said timing signal to start a single radial sweep; a range counter having a plurality of digit positions for counting a range, said range counter being operatively connected to said control means; further means connected to each of the digit positions on said counter, each of said means being responsive to a "0 to 1" transition of respective range counter positions and providing an output signal indicative of said transition; resolver means operatively connected to said antenna and providing a plurality of digital signals indicative of the sine and cosine of the azimuth of said antenna; a pair of electronic masks gating said transition signals in accordance with said sine and cosine signals respectively, each of said masks having an output signal indicative of the ordinate or abscissa of the radical range; ordinate and abscissa range counters respectively connected to the outputs of said masks, said counters being operative to provide an output signal proportional to the digital signals; and display means including a pair of inputs operatively connected to said ordinate and abscissa range counters, said display means being operative in response thereto to provide a range indication for said radar unit.

20. Apparatus for digitally deflecting a rotating plan position indicator beam in synchronism with an antenna rotation comprising; in combination; digital radial range counting means for providing range indicating digital signals; digital sine and cosine antenna azimuth resulting means for providing digital sine and cosine signals each indicative of antenna azimuth, said signals having a form of a signed numeric value; a pair of mask means operatively connected to said sine and cosine signals respectively, each connected to said digital radial range counting means and each of said masks having an output consisting of a plurality of pulses proportional to the antenna angle in any one of four azimuth quadrants; two digital counters each preset for every radial range count to one-half the maximum range count and each being of the same modulus as the radial range counting means for counting the signals from said masks; gating means for passing signals indicative of the count in said digital counters and responsive to said signed signals from said resolving means for complementing said passed signals when the signed signals indicate a negative numeric value; and display means including a cathode ray tube and means responsive to said gated signals for controlling the cathode ray tube whereby the electron beam therein is caused to rotate about an axis thereof.

21. For presentation of radar and non-radar data on a common display with zero drift, digital means for counting radial range and providing range indicating signals; digital resolving means for determining beam azimuth and providing signals indicative of signed sine and cosine of the azimuth; mask means operatively coupled to said digital means and to said digital resolving means for respectively comparing said last named signals and said range indicating signals in inverted order of numeric significance of said signals and providing two trains of signals respectively indicative of said comparison; a pair of digital counters respectively counting said trains of signals; separate output gating means on said counters responsive respectively to the sign indication of the sine and cosine resolved signals for selectively complementing signals leaving said digital counter; PPI display means responsive to digital deflection signals for providing deflection of an electron beam according to the numeric significance of the signals; non-radar data source means; buffer control means selectively passing deflection digital signals from said counters and said non-radar data source means to said PPI display means for providing a combined display of radar and non-radar data.

22. For use in a radar PPI display system; a pulse generator providing recurrent electrical impulses having a time displacement between any two successive impulses indicative of a quantitized radial range; a digital counter having a plurality of digit positions and providing carry pulses and including means for indicating the digit position of greatest significance having a change therein during any one count; gating control means responsive to an externally provided timing signal and for passing pulses from the generator to the counter for generating a radial range count; a digital resolver for providing signals indicative of the angular position of a radar interrogation signal beam, said signals being proportional to the sine and cosine of the angle of said beam; means for gating the indication of the counter digit most significant changes respectively with the sine and cosine signals; a pair of counters respectively counting the number of gated indications; range selection means including two multi-position switches, one of said switches being connected between the digital counter and the gating control means for selecting the carry pulse used to turn off the control means, the other of said switches connecting said externally provided timing signals to the two counters for providing an initial count signal indicative of one-half the maximum range selected by said switch; and display means responsive to the number of like comparisons for providing a centered rotating display beam.

References Cited in the file of this patent

UNITED STATES PATENTS

| | | |
|---|---|---|
| 2,986,728 | Hinckley | May 30, 1961 |
| 3,054,103 | De Faymoreau | Sept. 11, 1962 |
| 3,076,190 | Shames et al. | Jan. 29, 1963 |
| 3,094,694 | Beach | June 18, 1963 |